United States Patent [19]

Chabane et al.

[11] Patent Number: 5,018,268

[45] Date of Patent: May 28, 1991

[54] APPARATUS FOR FORMING METAL SHIELD FROM TAPE

[75] Inventors: Mohamed Chabane, Ste. Julie; J. Raymond Boucher, Chateauguay; Ali Pan, Kingston, all of Canada

[73] Assignee: Northern Telecom Limited, Montreal, Canada

[21] Appl. No.: 463,054

[22] Filed: Jan. 10, 1990

[51] Int. Cl.⁵ .............................................. B23P 19/04

[52] U.S. Cl. ........................................ 29/728; 29/828; 72/52; 72/57; 156/53; 156/54; 179/104; 179/107

[58] Field of Search ........................ 29/828; 72/51, 52; 156/53, 54; 174/104, 107

[56] References Cited

U.S. PATENT DOCUMENTS

| | | | |
|---|---|---|---|
| 4,308,662 | 1/1982 | Bohannon, Jr. | 29/828 |
| 4,377,908 | 3/1983 | Pan | 29/828 |
| 4,404,720 | 9/1983 | Bohannen, Jr. | 156/54 X |
| 4,569,704 | 2/1986 | Bohannen, Jr. et al. | 156/54 X |
| 4,622,092 | 11/1986 | Bohannon, Jr. et al. | 156/54 X |

*Primary Examiner*—Carl J. Arbes
*Attorney, Agent, or Firm*—R. J. Austin

[57] ABSTRACT

Forming a metal shield on a cable core in which a frusto-conical forming surface for the shield has a plurality of former sections disposed side-by-side from a downstream end of the former. The sections are removable, in order, from the downstream end to increase the downstream end diameter of the forming surface and may be replaced, in order, so as to decrease the diameter at the downstream end for the purpose of applying shields to cable cores of different diameters.

7 Claims, 7 Drawing Sheets

APPARATUS FOR FORMING METAL SHIELD FROM TAPE

This invention relates to forming of metal shield from type. Metal shields are used, for instance, in the electrical cable industry to protect cable cores from environmental conditions and also from sharp piercing objects. Conventionally, a metal shield is formed from flat tape which passes through a forming apparatus to shape the tape progressively into a tube which surrounds the core. This operation is performed by causing the flat tape to converge upwardly towards the core while longitudinal edge regions of the tape are turned upwards and around the core so that one edge region overlaps the other. Conventional apparatus for performing this process comprises belt formers which have spaced endless belts with tape engaging surfaces in contact with a lower surface of the tape along one flight of each belt. The belts are disposed in position with this particular flight of each belt progressively turning around the axis of the flight while moving around the cable core with the tape engaging surface of the flight facing towards the core so as to provide the tape forming operation. One disadvantage in this arrangement is that over the complete range of cable sizes, i.e. up to 3½ inch cable diameter, three sizes of belt formers are necessary, one for each end of the range and one for an intermediate region. Even with two sizes of belt formers, each former size is only completely successful for forming satisfactory shields over a narrow middle band of each end of the range with shield quality diminishing for diameters away from this narrow band.

Belt formers also have various other disadvantages in use. One problem concerns the initial setting of the belt positions. A belt former is expected to be useful for forming metal shields over a range of diameters. Hence, the belts need to be adjusted in position for each particular cable design. Such adjustment involves the need for cam discs and pulleys located at spaced intervals along the lengths of the belts. To dispose the operating flight of each belt in precisely the right positions at each location along its path and to provide the required turning characteristic to an edge region of a tape for a desired finished shield diameter is an extremely difficult and skilled procedure which requires lengthy training. This difficulty is caused not only in being able to locate each cam disc and pulley in a particular location, but also in locating successive cam discs and pulleys in such relative positions that the operating flight of each belt passes smoothly along its path as it twists progressively along its axis. Even when performed with skill, down time in use of the belt former between one cable length and another is undesirably lengthy and adds unduly to the cost of the cable. Apart from the belt adjustment requirements, it is not unusual for belt breakages to occur during cable manufacture; this leads to serious stoppages in the required continuous cable making procedure on any particular length exacerbated by the increased difficulty of replacing the broken belt with partly assembled cable elements extending through the belt former. Also, uneven wear between the two belts can cause forming problems.

In addition, although the above disadvantages are found in use of belt formers, the formers are not in themselves successful in forming a completed tubular metal shield. The belts move around the core in such a way that it provides arcuate regions laterally of the tape which are separated by flatter regions so that the partially formed shield has an open polygonal appearance in contrast to the smooth curvature which is desired. Upon moving from a downstream end of a belt former, a metal shield needs to pass through forming rolls to remove the flatter regions and impart a curved shape to the metal which is closer to that desired. The tape then passes through an overlapping die in which edge regions are closely overlapped and then through finishing rolls which consolidate the shield onto the cable core.

In addition, the belts force the tape edges upwards at commencement of the turning operation and it is at this stage that flatter regions of the tape lying in different planes become separated along a median line of the tape by a longitudinally extending kink formed by the belts. This kink, which is localized in the vicinity of the median line of the tape, is of extremely small radius and is impossible to remove as forming continues, thereby resulting in an undesirable longitudinally extending ridge in the finished cable. The appearance of this ridge is reproduced in the cable jacket which overlies the shield.

It has also been found that to prevent the belts of the former from exerting a distorting pull on corrugations of a corrugated tape, it is necessary to drive the belts at a speed slightly faster than the throughput speed of the tape. However, if these relative speeds are not precisely controlled, shortening of the pitch of the corrugations may result; this is sometimes accompanied by ripping of the tape.

The present invention provides a method and apparatus for forming a metal shield which seeks to avoid or minimize at least some of the above problems.

According to one aspect of the present invention, there is provided a former for forming a metal shield from tape as it is moves along a passline comprising a concave forming surface which extends along and faces inwardly onto the passline with at least a downstream end of the forming surface being frusto-conical while increasing in diameter in an upstream direction of the passline, the former having a plurality of former sections each of which defines an axially extending part of the forming surface, the former sections being locatable together in operational positions in a specific order, side-by-side axially of the forming surface in the downstream direction, and removable from their operational positions from the downstream end of the former in succession in the upstream direction, so as to alter the downstream end diameter of the forming surface, and tape engaging means locatable upstream of some at least of the former sections for engaging along a longitudinally extending median region of the tape and for urging said longitudinally extending median region against the forming surface as the tape is fed along the passline.

With the use of the former of the invention as defined above, the tape engaging means in urging the longitudinally extending median region of the tape against the forming surface causes the tape at each lateral side of the region to be arcuately formed against the forming surface. This avoids the formation of flat regions of the tape and any accompanying longitudinally extending kink.

Also, before use, the former sections may be located together or removed from one another to provide a downstream end diameter of the frusto-conical forming surface suitable for the final desired diameter of the metal shield. The former sections may be completely detachable from the former to be taken from their operational positions and for stowage purposes. Conveniently, however, each of the former sections may be pivoted about an axis to move it into and out of its operational position and preferably all of the sections are pivoted about a common axis. In a practical arrangement, the former sections are pivotally movable between a stowage bay and their operational positions.

The tape engaging means may be localized to operate against a laterally narrow longitudinally extending region of the tape, but advantageously is provided by a roller rotatable about an axis transverse to the axis of the passline and having a convex outer surface which, as it rotates, continuously confronts and lies parallel to an adjacent region of the frusto-conical forming surface so as to form the longitudinally extending region of the tape into curved shape.

Thus, a single former of the invention may be used for forming shields of the total range of diameters of electrical cable by virtue of the fact that the former sections may be inserted into the former and removed individually to change the downstream end diameter. Also the former operates successfully to avoid the formation of flat regions of the shield at the commencement of the turning operation thereby also avoiding a longitudinal kink between such flat regions.

According to another aspect of the present invention, there is provided a method of forming metal tape into a metal shield around a core member comprising moving the tape along a passline while applying a lateral load progressively along a longitudinally extending median region of the tape to urge the median region against a concave forming surface whereby the tape is formed completely into a laterally curved shape; passing the curved tape into a downstream frustoconical end portion of the forming surface provided by a plurality of former sections each of which defines an axially extending part of the forming surface, the former sections having been previously located together to provide a desired downstream end diameter to the frusto-conical surface; and decreasing the overall lateral width of the curved tape as it moves along its path in engagement with the frusto-conical end portion of the forming surface while moving the edge regions of the tape into overlapping relationship so that the tape progressively surrounds and moves towards the core member.

Embodiments of the invention will now be described, by way of example, with reference to the accompanying drawings, in which.

Figure 1:
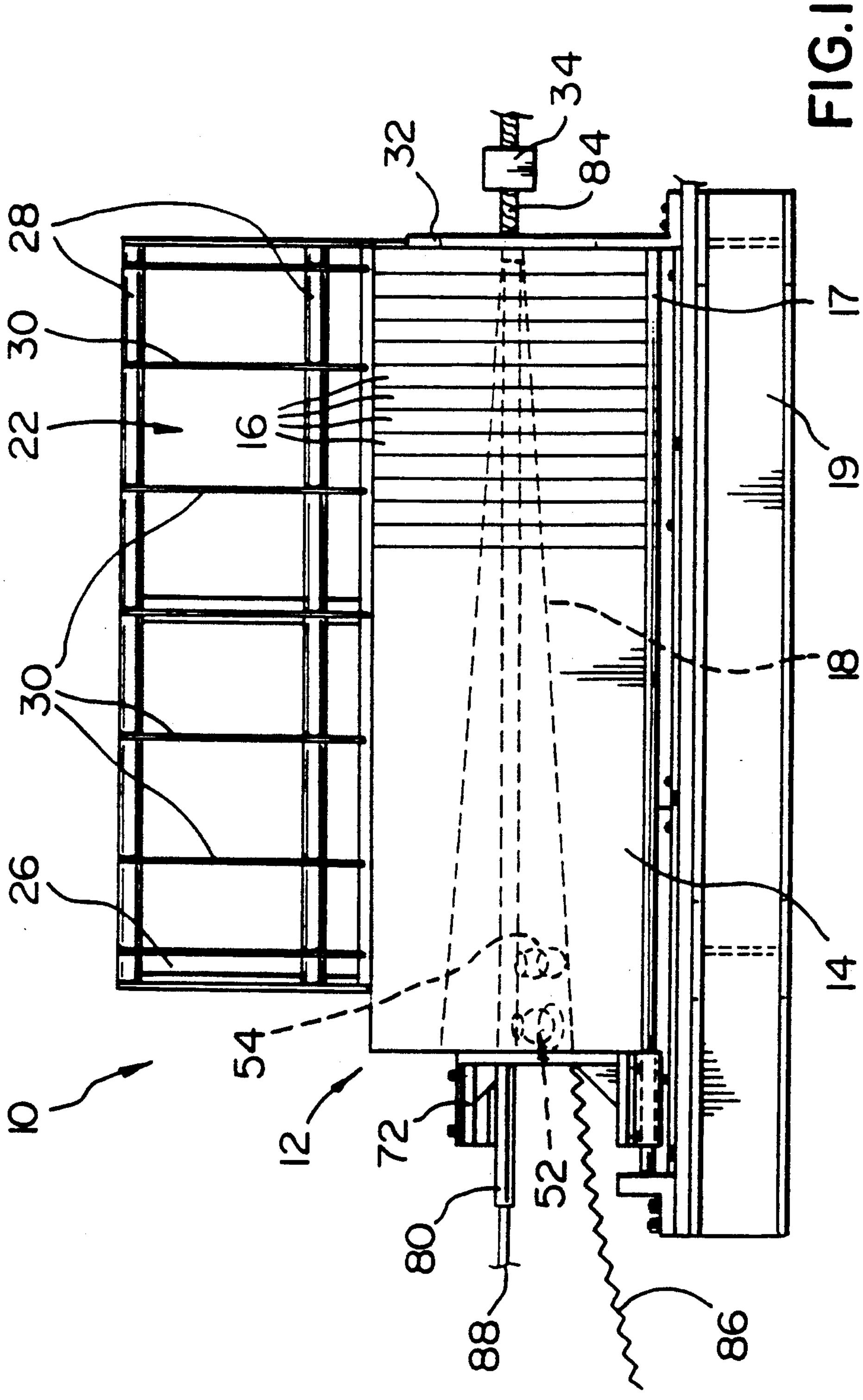
FIG. 1 is a side elevational view of apparatus according to a first embodiment for forming a metal shield around a cable core.
Figure 2:
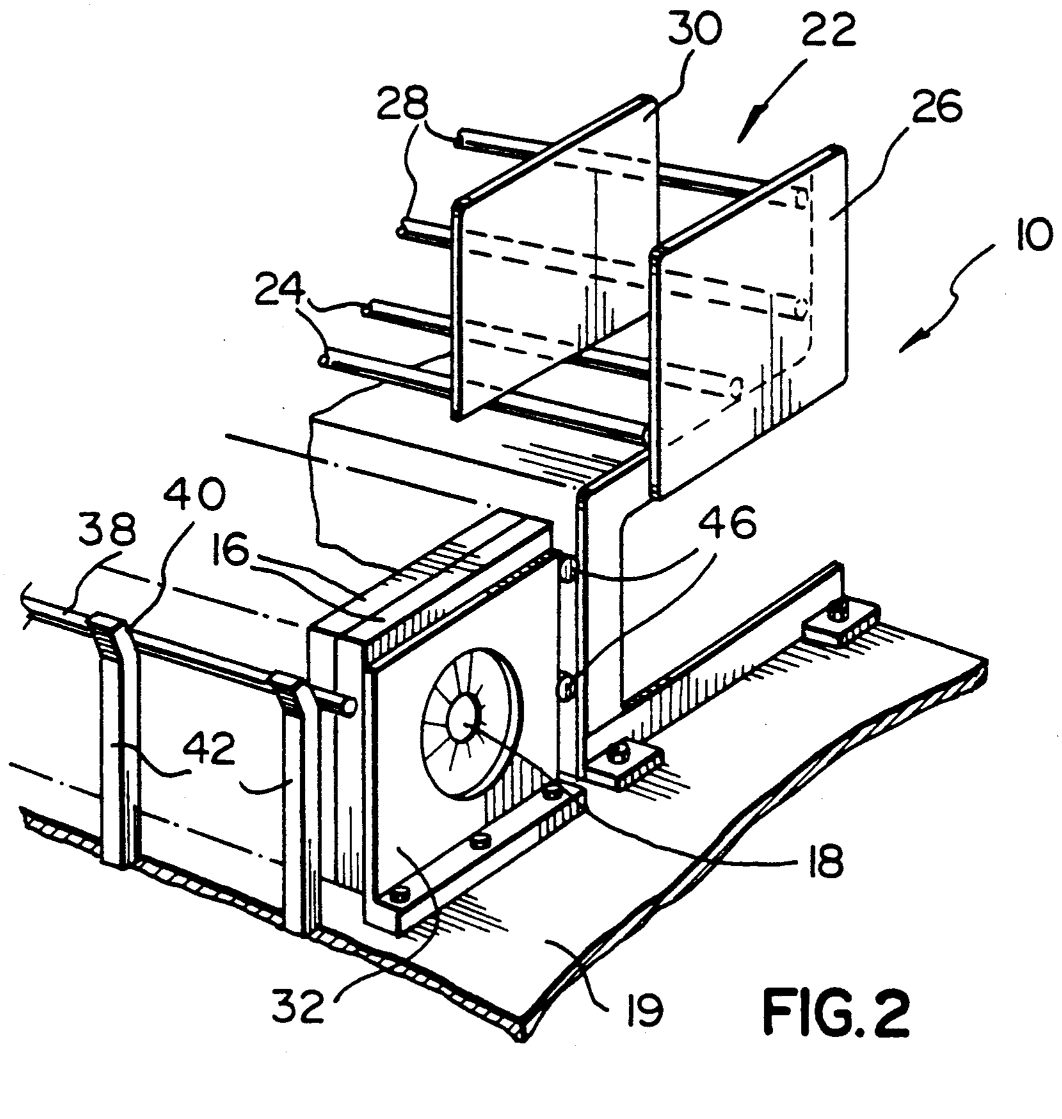
FIG. 2 is an isometric view of one end of the apparatus of the first embodiment.
Figure 3:
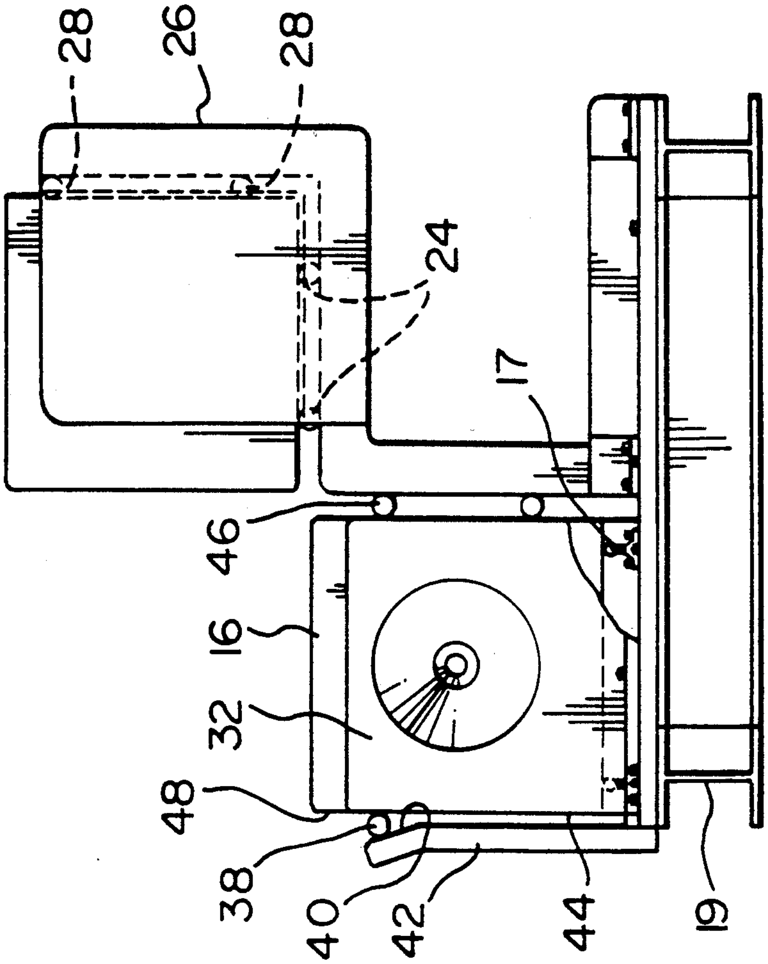
FIG. 3 is a downstream end view of the apparatus with an end overlapping die omitted for clarity.
Figure 4:
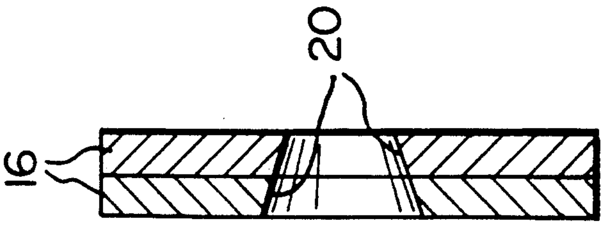
FIG. 4 is a cross-sectional view through two adjacent forming sections of the apparatus of the first embodiment.

In a first embodiment as shown in FIGS. 1, 2, 3 and 4 apparatus 10 for forming a metal shield around a cable core from metal tape comprises a former indicated generally at 12 which has a one-piece upstream section 14 and a plurality of planar former sections 16 disposed downstream from the one-piece section 14. The sections 14 and 16 are all of square end view with the same dimensions (see FIGS. 2 and 3). The former provides a concave forming surface which is continuous from end-to-end of the former in that all of the sections 14 and 16 define between them a frusto-conical forming surface 18 which tapers in the downstream direction along a passline for a cable core.

Figure 5:
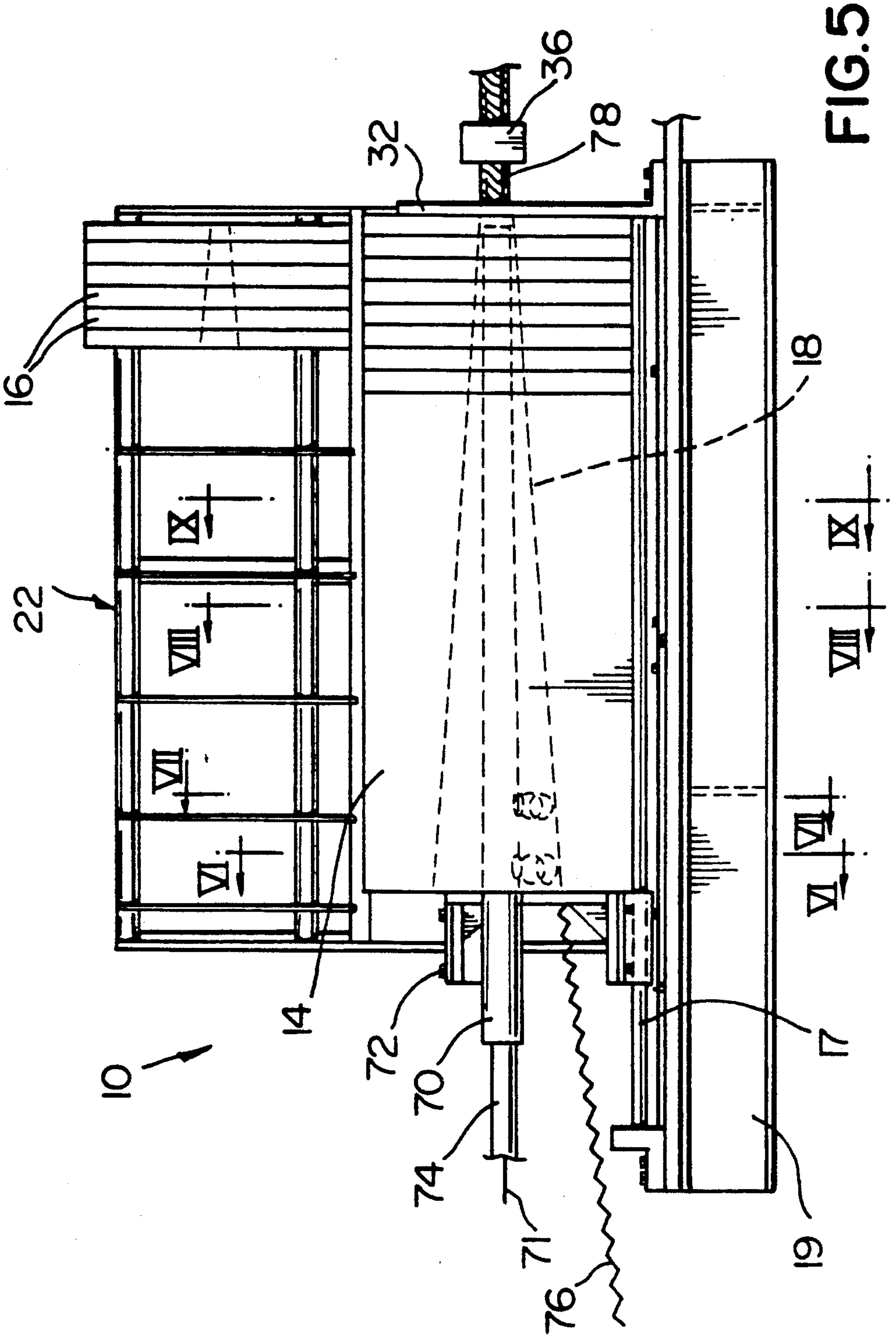
FIG. 5 is a view of the apparatus similar to FIG. 1 and arranged for forming a shield around a cable core of different diameter.

The section 14 is held in position around the passline but the former sections 16 are locatable together as a total assembly side-by-side in operational positions as shown in FIG. 1, in a specific order side-by-side axially of the upstream section in the downstream direction along the passline. In their operational positions and together with the section 14, the former sections 16 are supported upon and upstand from two parallel round section support bars 17 which are carried upon the machine frame 19. Each of the sections 16, as shown particularly in FIG. 5, is formed as a planar plate with a frusto-conical inner surface 20 which forms part of the total frusto-conical surface 18. The former sections 16 are removable from their operational positions in sequence, and as desired from the downstream end of the former, i.e. in the upstream direction, so as to shorten the total length of the former for operation. This removal of sections increases the downstream diameter of the forming surface 18 to suit particular size requirements for a metal shield to be provided on a particular cable core. Alternatively removed sections 16 may be inserted in sequence, and in the downstream direction, into their operational positions, so as to decrease the downstream end diameter of the forming surface as desired The number of sections 16 and the degree of taper of the forming surface 18 are such that the downstream diameter of the forming surface may be changed from a minimum diameter, with all the sections in place as shown in FIG. 1, to a maximum diameter with only section 14 remaining in operational position, whereby metal shields may be provided successfully on this former for a range of cable diameters approximately between 0.25 inches and 3½ inches.

To enable each of the forming sections 16 to be moved in and out of its operational position, each section 16 is individually removable to be placed in a stowage bay 22 in which they are supported in vertical planar positions upon horizontal bars 24 of a framework 26, other bars 28 engaging side edges of the sections 16. As is more clearly shown in FIG. 2, the framework 26 has partitions 30 to enable a specified number of sections 16 to be carried between partitions.

The forming surface 18 serves to progressively curve a metal tape around a cable core as it moves along its feedpath while moving the edge regions of the tape into overlapping relationship so that the tape progressively surrounds and moves towards the cable core. To complete the shield forming operation, an overlapping die of conventional construction is provided adjacent the downstream end of the former. It is important that this overlapping die is disposed at a specific set position downstream from the operational part of the former and for this purpose, the part of the former 12 at any time in operation is slidably carried upon the support bars 17 to locate the downstream end of the operational part of the former against a fixed vertical end plate 32 of the machine frame. Thus, with for instance, all of the sections 16 in operational position, as shown by FIG. 1, the former is disposed in a certain axial position relative to the passline so as to have a specific distance from a suitably sized overlapping die 34 in the overlapping die position. However, as shown in FIG. 5, for the manufacture of a metal shield for a cable core of larger diameter, then certain downstream former sections 16 are placed in the stowage bay 22 and the operational part of the former 12 is moved downstream of the passline to bring its operational downstream end against the end plate 32 and to within the same distance from another suitable overlapping die 36 disposed in the die position A suitable clamping means (not shown) is provided for locking the operational part of the former in any desired position upon the guide rails 17 for use purposes.

It is necessary, of course, to dispose all of the former sections 16 exactly in alignment along the passline when in their operational positions. Any suitable alignment mechanism may suffice for this purpose. However, in the present embodiment, the alignment mechanism comprises an alignment bar 38 (FIGS. 2 and 3) which is forced downwardly between an inclined surface 40 of a framework bar 42 and vertical side edges 44 of the former sections 16 so as to ensure that all of the surfaces and thus the sections are held aligned and urged against opposed edge alignment supporting bars 46 provided on the support frame.

Figure 6:
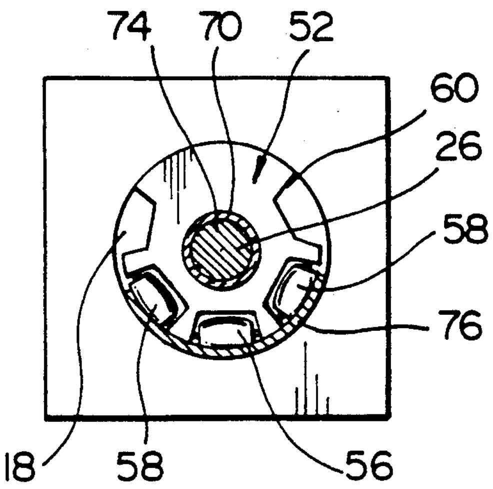
FIGS. 6 and 7 are cross-sectional views respectively along lines VI—VI and VII—VII in FIG. 5 of the apparatus.

In the embodiment of FIG. 1, a tape engaging means is located upstream of the former sections 16 for engaging along a longitudinally extending median region of the tape when this is moved through the former and for urging this longitudinally extending region against the forming surface. While the tape engaging means may comprise one rotatable member which merely contacts the tape during its movement to force it against the forming surface 18, it is advantageously provided by a rotatable means which urges the longitudinally extending median region of the tape against the forming surface As shown particularly by FIGS. 6 and 7 in this embodiment, the rotatable means comprises two roller and supporting frame assemblies 52 and 54 disposed at spaced locations along the passline and located within an upstream end of the former 12. The assembly 52 comprises an intermediate roller 56 and outside rollers 58, the rollers spaced apart axially of one another along a curved axial path around the passline 26, each roller being rotatably held in a frame 60 of the assembly 52. As can be seen from FIG. 6, each roller 56 and 58 has a convex outer surface which continuously confronts and lies parallel to an adjacent region of the forming surface with the passline for the metal lying between the convex surfaces and the adjacent region of the forming surface 18. The intermediate roller 56 is located so as to urge a longitudinally extending median region of the tape against the forming surface with each of the rollers 58 positioned to operate against laterally displaced positions of the tape.

The assembly 54 comprises four rollers 64 which are rotatably carried upon a support 66 in a similar fashion to that of the rollers 56 and 58 in the assembly 52. The positions of the rollers 64 are such that two of the rollers 64 lie in alignment, in a downstream direction along the passline for the metal, with the spacings between the roller 56 and the rollers 58. The other rollers 64 lie further outwardly from the intended median plane of the metal, as it passes through the apparatus, than the rollers 58. The rollers 64 also have convex outer surfaces which confront and lie parallel to adjacent regions of the forming surface 18.

In use of the apparatus of the first embodiment, consideration will first be given to the wrapping of a metal shield around a cable core of a diameter intermediate the upper and lower limits of the former 12. In this case certain of the downstream former sections 16 are disposed in the stowage bay 22 with the remainder in their operational positions, for instance, as shown in FIG. 5, and with the operational part of the former disposed axially along the passline in appropriate position corresponding to the associated overlapping die 36 for use with the cable core of the associated diameter. An appropriately sized cable core guide 70 is located in a position surrounding a passline 71 for cable core 74 and is held in position by a supporting bracket 72 mounted upon the upstream end of the former. For complete forming control of a metal shield, the core guide 70 should terminate approximately 0.5 inches upstream from the downstream end of the forming surface 18.

Figure 7:
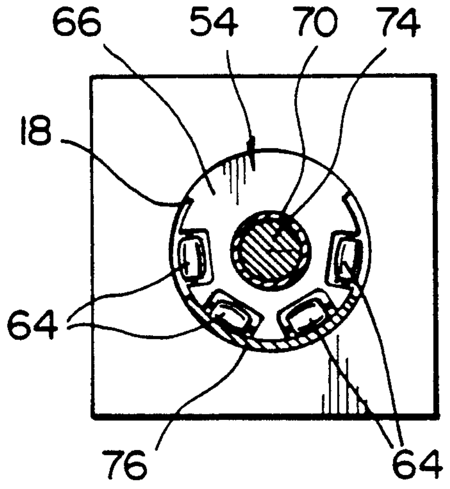

The cable core 74 is then passed through the cable core guide 70 and through the overlapping die 36 simultaneously with the movement in the downstream direction of corrugated metal tape 76 which is generally laterally planar. As the tape proceeds into the former 12, it passes between the rollers 56 and 58 of the assembly 52 and the former surface 18 (FIG. 6) and then between the rollers 64 and the former surface (FIG. 7). The tape 76 will be engaged by the two inner rollers 64. However, it will only be engaged by the outer rollers 64 if it has sufficient lateral width dependent upon the diameter of core to which the tape is being applied. As it engages the rollers 56 and 58, the tape is urged downwardly against the former surface 18 so as to conform substantially closely to the shape of the former. In particular, the longitudinally extending median region of the tape is urged against the former surface 18 by the roller 56 and flat laterally extending regions of the tape are avoided, thereby also avoiding any longitudinally extending kink in the tape. The positioning of the rollers 64 immediately downstream from the rollers 56 and 58 further ensure that the tape is completely curved laterally from one edge to the other without any flat sections because the rollers 56, 58 and 64, engage all lateral parts of the tape during its movement in the downstream direction.

Figure 8:
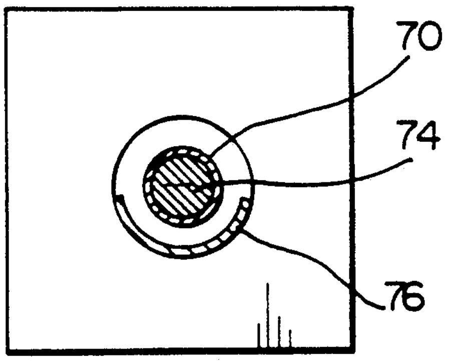
FIGS. 8 and 9 are cross-sectional views of the apparatus taken along lines VIII—VIII and IX—IX in FIG. 5.
Figure 9:
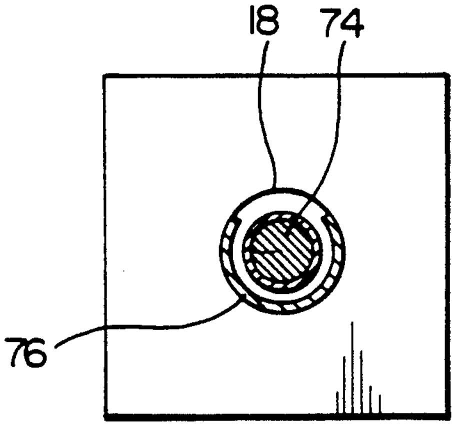

The tape then proceeds to move along the tapering forming surface 18 during which its lateral outside dimension decreases and edges of the tape move towards overlapping relationship as shown at two further stages along the former in FIGS. 8 and 9. Thus, after any flat laterally extending regions of tape have been avoided and curvature has been provided upon the tape, continued movement along the former easily and progressively influences each laterally extending region of the tape so that it follows a curve of decreasing diameter to the downstream end of the surface 18. Upon reaching the downstream end of the surface 18, the tape, now as a partially formed shield 78 (FIG. 5) with overlapping lateral extending edges, passes with the cable core 74 through the overlapping die 36 which completes the shield formation around the core preparatory to extrusion of a cable jacket upon the shield.

Thus, as can be seen by the above embodiment, the rollers 56, 58 and 64 eliminate any possibility of flat laterally extending sections of tape during its formation. It is extremely important that such sections are eliminated immediately shield formation commences in order to avoid longitudinally extending kinks in the tape and forming problems at later stages. Further, as a result of the formation of the curvature completely around the tape at its commencement, the forming operation is completed extremely smoothly and provides a substantially circular shield.

In addition, the sections 16 which are movable into and out of their operational positions make the former 12 useful for the total range of cable sizes. For instance, whereas the embodiment has been described with reference to manufacture of cable of a diameter intermediate the range of the former, the former is easily adapted to forming a metal shield for any other cable size simply by removal or addition of appropriate sections 16 dependent upon required diameter. For instance, and for manufacture of a larger cable, a suitable number of further sections 16 are removed in order from the downstream end of former 12 and located in the stowage bay. For a smaller diameter, sections 16 are added in order in the downstream direction to the former until for the smallest diameter, all sections 16 are added as in FIG. 1. A core guide 80 of smaller and suitable diameter is held by the bracket 72 to the operational part of the former which is moved on the guide rails 17 to the appropriate position upstream from the suitable overlapping die 34. The core guide 80 terminates approximately 0.5 inches from the downstream end of forming surface 18. A metal shield 84 is then provided, from corrugated tape 86, around a cable core 88 of smaller diameter than that shown in FIG. 4.

In a second embodiment, as shown in FIGS. 10 to 14, an apparatus 90 for forming a metal shield around a cable core is lighter in weight and uses less material than in the first embodiment. The apparatus 90 comprises a frustoconical shaped one-piece upstream section 92 of a tape former, i.e. with a wall of constant thickness, to provide a frusto-conical outer surface 94 and a frusto-conical upstream end portion of a forming surface 96. The tape former also comprises a plurality of planar forming sections 98 disposed downstream of the one-piece section 90. These sections 98 are substantially smaller than the sections 16 of the first embodiment and need have a lateral dimension which only corresponds substantially with that of the downstream end of the upstream section 92. In fact, the sections 98 are circular in end view (FIG. 12) and are provided by cone dies which together produce the downstream end portion of the forming surface 96. The sections 98 are movable from side-to-side from operational positions (FIG. 10) in their total assembly, into stowed positions in specific order as described for the sections 16 in the first embodiment.

Figure 10:
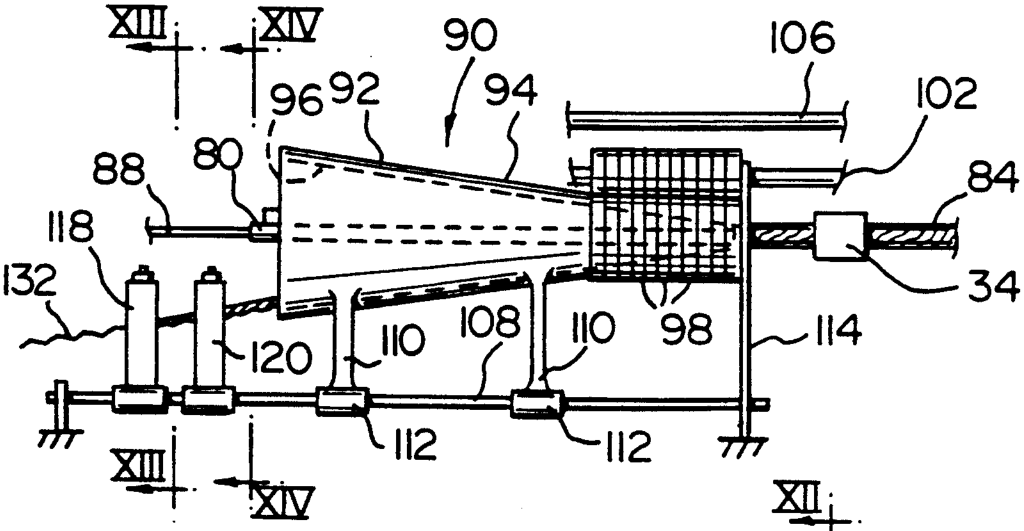
FIG. 10 is a side elevational view similar to FIG. 1 of apparatus according to a second embodiment of the invention.
Figure 11:
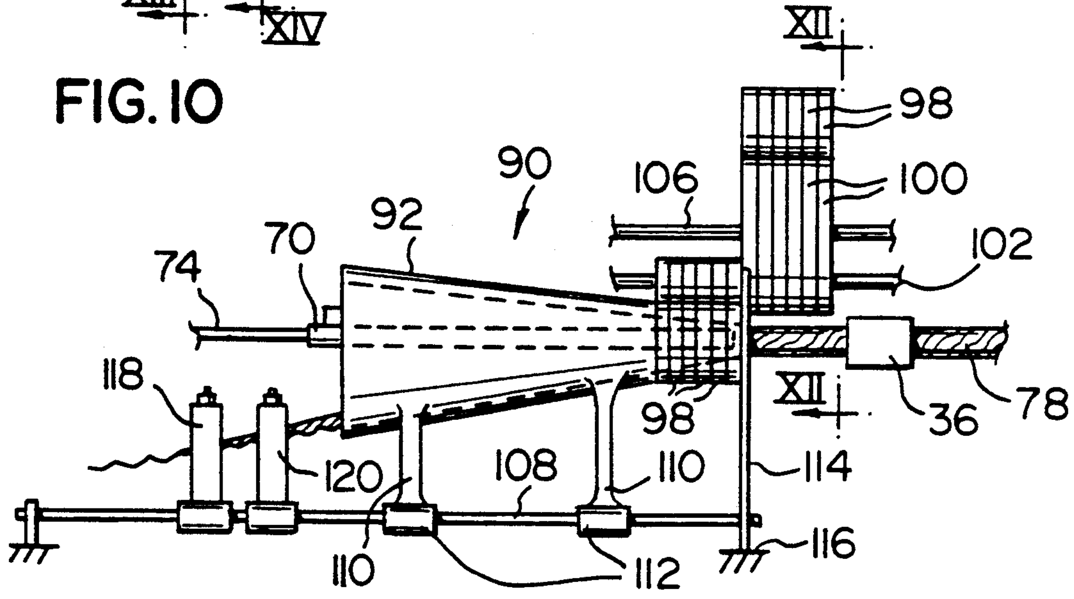
FIG. 11 is a view of the apparatus of the second embodiment similar to FIG. 10 and arranged for forming a shield of different diameter.
Figure 12:
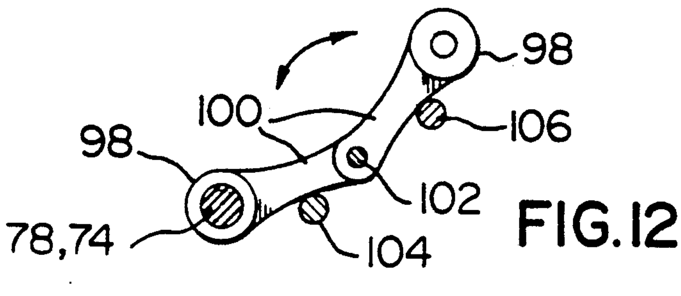
FIG. 12 is a cross-sectional view taken along line XII—XII in FIG. 11 of the apparatus of the second embodiment.

FIG. 10 shows all sections 98 in their operational positions As shown in FIGS. 11 and 12, the sections 98 are pivotally mounted by individual arms 100 around a common shaft 102 extending parallel to the passline. In their operational positions, sections 98 are located correctly in position by a support shaft 104 which engages the underside of the arms 100.

To locate the forming sections 98 in their stowed positions, the arms 100 carrying the sections 98 are pivotally moved clockwise, as viewed in FIG. 12, around the shaft 102 until the arms 100 are supported upon the support shaft 106 with the sections 98 removed completely by pivotal action from the operational positions. To enable the arms to operate and be supported in this manner, all of the shafts 102, 104, 106 are secured in position to the machine frame 19.

The upstream section 92 is slidably movably mounted upon two rails 108 by support arms 110 carrying bushed sleeves 112 surrounding the shafts 108. By this means, the support section 92 is movable axially of the passline towards and away from an end plate 114 secured to the machine frame 116 so that for any particular operation employing a specific number of planar forming sections 98, the downstream end of the operational part of the former will be located in a desired position against the end plate 114. This is shown by FIG. 11 in which certain of the sections 98 have been moved into their stowed positions as described above. It is worthy of note that the forming sections 98 in their stowed positions move axially upon the shaft 102 with the forming sections remaining in the operational position as these sections are moved up to the end plate 114. This is clearly shown by FIG. 11.

Figure 13:
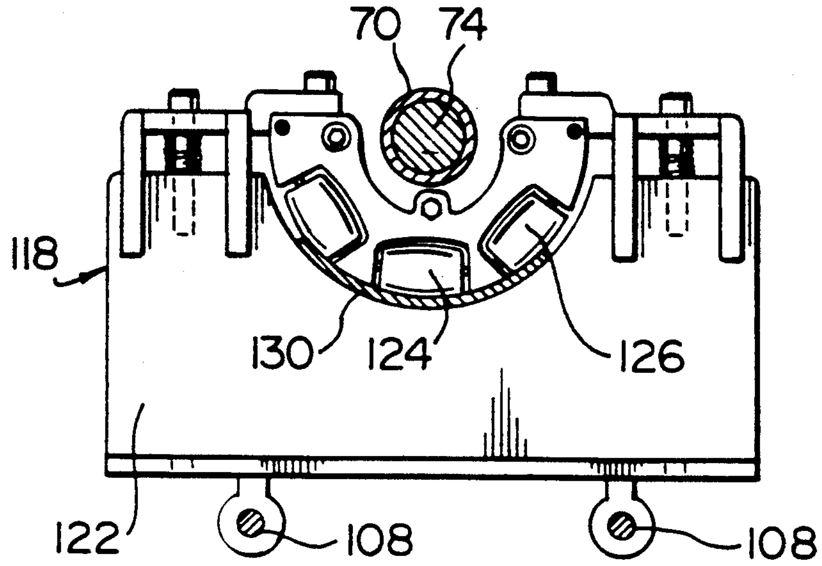
FIGS. 13 and 14 are cross-sectional views of the apparatus of the second embodiment taken, respectively, along lines XIII—XIII and XIV-XIV in FIG. 10.
Figure 14:
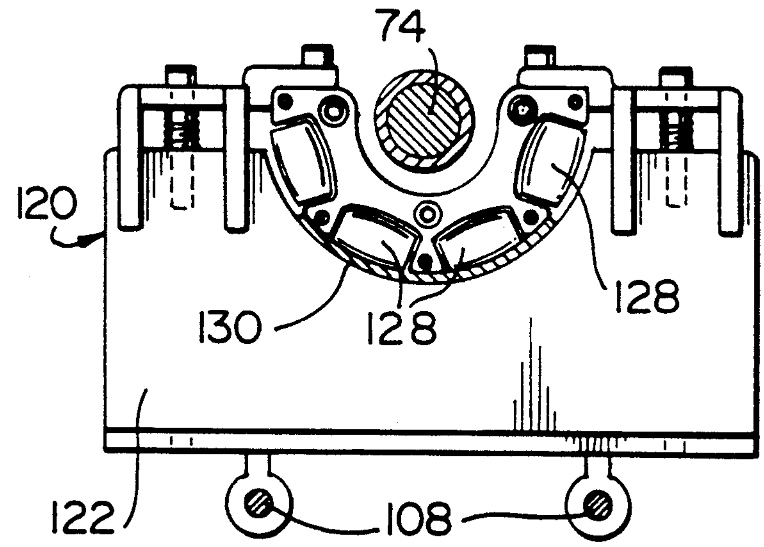

The former is particularly useful with a rotatable means for imposing control curvature upon metal tape which forms parts of assemblies separate from the former. This is shown by FIGS. 10 and 11 and also in FIGS. 13 and 14. Rotatable means for imposing control curvature upon the metal tape comprises assemblies 118 and 120 which are upstream from and spaced from the section 92 of the former. Each of the assemblies 118 and 120 comprises a support stand 122 (FIGS. 13 and 14). Each stand 122 is slidably mounted upon the two shafts 108 in a manner similar to that described for the upstream section 92 of the tape former In the assembly 118, rollers 124 and 126 correspond respectively in position to the rollers 56 and 58 of the first embodiment and rollers 128 in the assembly 120 correspond to the rollers 64 in the first embodiment. Each machine stand 122 comprises an arcuate surface 130 facing the outer peripheral surface of the rollers 124 to 128, the arcuate surface 130 forming an upstream extension of part of the frusto-conical forming surface 96 of the former.

In use of the second embodiment, metal tape 132 is passed between the rollers 124, 126 and 128 and the forming surface 130 to form the completely laterally curved surface to the tape before it proceeds along the remainder of the forming surface provided by the former sections 92 and 98. The apparatus of the second embodiment operates in a similar fashion to that described with reference to the apparatus of the first embodiment and the same reference numerals are included for parts similar to those of the first embodiment.

What is claimed is:

1. A former for forming a metal shield from tape as it is moved along a passline comprising a concave forming surface which extends along and faces inwardly onto the passline with at least a downstream end of the forming surface being frusto-conical while increasing in diameter in an upstream direction of the passline, the former having a plurality of former sections each of which defines an axially extending part of the forming surface, the former sections being locatable together in operational positions in specific order, side-by-side around the passline and axially of the forming surface in the downstream direction, and removable from their operational positions from the downstream end of the former in succession in the upstream direction, so as to alter the downstream end diameter of the forming surface and to locate the former sections in succession in stowed positions spaced from one side of the passline, and tape engaging means locatable upstream of some at least of the former sections for engaging along a longitudinal extending median region of the tape and for urging said longitudinally extending region against the forming surface as the tape is fed along the passline.

2. A former according to claim 1 wherein each former section is pivoted about an axis to move it into and out of its operational positions.

3. A former according to claim 2 wherein all of the former sections are pivoted about a common axis.

4. A former according to claim 3 wherein the former sections are movable about the common axis between their stowed positions and their operational positions.

5. A former according to claim 1 wherein the tape engaging means comprises a roller rotatable about an axis transverse to the axis of the feedpath, the roller having a convex outer surface.

6. A former according to claim 5 wherein the roller is disposed axially between upstream and downstream ends of the concave forming surface and the roller, during rotation, continuously confronts and lies parallel to an adjacent region of the forming surface with the passline lying between the convex surface and said adjacent region of the forming surface.

7. A former according to claim 1 provided with a stowage bay for the former sections which is disposed spaced from one side of the passline.

* * * * *